United States Patent Office 3,511,755
Patented May 12, 1970

3,511,755
SYNTHESIS OF L-ASPARAGINASE
Oleh T. Ratych, Edison, Robert S. Robison, North Brunswick, and Bernard Berk, Westfield, N.J., assignors to E. R. Squibb & Sons, Inc., New York, N.Y., a corporation of Delaware
No Drawing. Filed Mar. 28, 1967, Ser. No. 626,383
Int. Cl. C07g 7/028
U.S. Cl. 195—66                                  10 Claims

ABSTRACT OF THE DISCLOSURE

This invention relates to a new and improved process for preparing the enzyme, L-asparaginase. In accordance with the process of this invention, L-asparaginase is prepared by subjecting *Escherichia coli* to the action of lysozyme. The cells are preferably first dried by treatment with acetone.

---

This invention relates to a new and improved process for preparing the known enzyme, L-asparaginase. Prior to this invention, it was known that L-asparaginase could be liberated from *Escherichia coli* (*E. coli*) cells by either ultrasonic disruption of the cells or by some other mechanical means, such as a colloid mill. It has now been found that such cell lysis can be accomplished by means of lysozyme.

In its broadest aspects, therefore, the present invention relates to a process for obtaining L-asparaginase by subjecting cells of *E. coli* to the action of lysozyme. The reaction is preferably carried out by contacting the cells with lysozyme at any normal temperature, preferably a temperature in the range of about 30° C. to about 45° C., and optimally in the range of about 30° C. to about 40° C. Preferably, at least about 0.2 mg. of lysozyme is present per gram of cells, and optimally at least 0.5 mg. of lysozyme is used per gram.

Although any cells of *E. coli* can be used, in the preferred embodiment of this invention, the cells are first dried, as by treatment with acetone; the treatment preferably being conducted by suspending a wet cell paste of *E. coli* cells obtained by centrifugation in distilled or deionized water. The cell suspension is then preferably added to cold acetone. After mixing, the acetone precipitated cells are recovered by filtration, and dried.

The cells of *E. coli* are intermixed with the lysozyme, preferably at the temperature and minimum concentration stated hereinbefore. The intermixing and lysozyme lysis is preferably carried out at a pH in the range of about 5 to about 9, and optimally at about 8, by using a buffering agent in the medium. Although any buffering agent that buffers in the desired pH range can be used, the preferred buffer is a sodium phosphate buffer. The lysis is preferably carried out while agitating the mixture and is completed in less than ten minutes.

The L-asparaginase is recovered by conventional techniques, such as nuclei acid precipitation and ammonium sulfate fractionation to remove other proteins. The L-asparaginase can be further purified by diethylaminoethylcellulose column chromatography.

The following examples illustrate the invention (all temperatures being in centigrade):

EXAMPLE 1

(a) Preparation of acetone dried *E. coli* B cells

*E. coli* B is grown under submerged conditions for 20 hours in a suitable medium at 37°. The cells are recovered by centrifugation and then washed with cold pH 8.0 0.05 M sodium phosphate buffer. The washed cells are recovered as a cell paste. From 3,000 liters of whole broth 29.2 kg. of washed cell paste is obtained. This cell paste is suspended in deionized water so that the final volume is 29.5 liters. The cell suspension is added slowly with vigorous agitation to 13.5 liters of acetone at 23° and slurried for 30 minutes. Agitation is stopped and the acetone precipitated cells are allowed to settle for 55 minutes. The cells are recovered by filtration, washed in situ with acetone and vacuum dried. The yield is about 7,762 grams of cells with an L-asparaginase assay at a pH of 5.0 of 16,800 units/gram.

(b) Recovery of the L-asparaginase 250 grams of *E. coli* B acetone powder prepared as described in step (a) are homogenized with 5 liters of 0.05 M sodium phosphate buffer pH 8.0 containing 125 mgs. (0.05%) of lysozyme. The homogenized cell suspension is heated to 38° and incubated for 30 minutes with occasional stirring. After incubation, the mixture is cooled down to about 4° and cell debris removed by centrifugation. All operations are carried out at about 5°. 4.655 liters of cell-free supernatant is obtained. The nuclei acids are precipitated by the addition of 235 ml. of 1 M $MnCl_2$. After removal of the precipitated material by centrifugation, the supernatant (4.4 liters) is brought to about 2 molar by the addition of solids $(NH_4)_2SO_4$ (1.29 kg.) with stirring. The suspension is adjusted to pH 8.0 with concentrated $NH_4OH$. The precipitate is removed by centrifugation and the supernatant (5.0 liters) is brought to about 4 molar by the addition of solid $(NH_4)_2SO_4$ and is adjusted to pH 8.0 by the addition of $NH_4OH$. The precipitate (about 180 grams) is collected by centrifugation and is redissolved with 200 ml. of 0.02 M sodium phosphate buffer at pH 8.0 and after dialysis against three changes of 0.02 M sodium phosphate buffer yielding 870 ml. of dialysate. The above dialysate is chromatographed on a column of diethylaminoethylcellulose.

EXAMPLE 2

(a) Preparation of lyophilized *E. coli* B cells

*E. coli* B is grown under submerged conditions for 20 hours in a suitable medium at 37°. The cells are recovered by centrifugation. The cell paste is washed first with cold pH 8.0, 0.05 M sodium phosphate buffer and then with cold distilled water. From 409 liters of broth, 2,234 grams of washed cell paste are obtained.

The cell paste is then suspended in sufficient distilled water to provide a suspension containing approximately 44 grams of wet cell paste/100 ml. 530 cc. of this cell suspension is shell frozen in suitable containers using a Dry Ice-acetone bath. After drying in vacuum for 72 hours, 62 grams of lyophilized cells are obtained. These cells have an L-asparaginase content, based on an assay at pH 5.0, of 12,360 units/gram.

(b) Recovery of L-asparaginase from wet cells 50 ml. of wet cell suspension (about 10% of *E. coli* B cell suspension) obtained in step (a) are homogenized with 50 ml. of 0.05 M tris buffer pH 8.5 containing 5 mgs. (0.1%) of lysozyme. The homogenized cell suspension is heated to 37° and incubated at same temperature for a period of 2 hours with occasional shaking. After ½ and 2 hours, aliquots of incubation mixture are withdrawn and cooled to 4°. The cell debris is removed by centrifugation. Based on an assay at pH 5.0 the clarified cell-free extracts are found to contain 274 and 390 units per ml. respectively. This is respectively 35 and 50% of that obtained by sonic disruption of the wet cell suspension. Purification is accomplished by the sequence of steps outlined in Example 1.

(c) Recovery of L-asparaginase from lyophilized cells 5 grams of *E. coli* B lyophilized cells obtained in step (a) are homogenized with 100 ml. of 0.05 M tris buffer pH 8.5 containing 5 mgs. (0.1%) of lysozyme. The homogenized cell suspension is heated to 37° and incubated for a period of 2 hours with occasional shaking. After ½ and 2 hours aliquots of incubation mixture are withdrawn and cooled to 4°. The cell debris is removed by centrifugation and the clarified extract assayed. Based on an assay at pH 5.0 the cell-free extracts of the lyophilized cells are found to contain 4200 and 4400 units/gm. respectively. This represents respectively 81 and 85% of that obtained by sonic disruption of the lyophilized cells. Purification is accomplished by the sequence of steps outlined in Example 1.

The invention may be variously otherwise embodied within the scope of the appended claims.

What is claimed is:

1. A process for obtaining L-asparaginase which comprises treating cells of *Escherichia coli* with lysozyme, the treating taking place after first drying the cells, and recovering the L-asparaginase formed.

2. The process of claim 1, wherein the drying is accomplished by treating the cells with acetone.

3. The process of claim 2, wherein the *Escherichia coli* is *Escherichia coli* B.

4. A process according to claim 2 wherein the cells of *Escherichia coli* are suspended in water during treatment with acetone.

5. A process according to claim 1 wherein the treating with lysozyme is carried out at a pH in the range of about 5 to about 9.

6. A process according to claim 5 wherein the pH is about 8.

7. The process according to claim 6 wherein the pH is maintained at about 8 by use of a buffering agent.

8. A process according to claim 7 wherein the buffer is a sodium phosphate buffer.

9. A process according to claim 1 wherein the treating with lysozyme is carried out under agitation.

10. A process according to claim 2 wherein the acetone is cold.

References Cited

Mashburn et al. (I), Archives of Biochemistry & Biophysics, vol. 105, No. 2, pp. 450–452 (1964).

Mashburn et al. (II), Nature, vol. 211, pp. 1403–1404, September 1966.

Malamy et al., Biochemical & Biophysical Research Communications, vol. 5, No. 2, pp. 104–108 (1961).

Methods in Enzymology, vol. II, pp. 421 and 786 (1955).

LIONEL M. SHAPIRO, Primary Examiner